US011879741B2

(12) United States Patent
Rao et al.

(10) Patent No.: US 11,879,741 B2
(45) Date of Patent: *Jan. 23, 2024

(54) OPTIMIZED ISSUE REPORTING SYSTEM

(71) Applicant: Uber Technologies, Inc., San Francisco, CA (US)

(72) Inventors: Shailendra Ramineni Rao, Palo Alto, CA (US); Nirav Bipinchandra Mehta, Sunnyvale, CA (US); Paweena Attayadmawittaya, Oakland, CA (US); Janice Jieun Suh, Brooklyn, NY (US); Hanzhou Li, Sunnyvale, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/930,646

(22) Filed: Sep. 8, 2022

(65) Prior Publication Data

US 2023/0003532 A1    Jan. 5, 2023

Related U.S. Application Data

(63) Continuation of application No. 16/271,155, filed on Feb. 8, 2019, now Pat. No. 11,466,994.

(51) Int. Cl.
*G01C 21/34* (2006.01)
*G01C 21/36* (2006.01)
*G06F 16/29* (2019.01)

(52) U.S. Cl.
CPC ....... *G01C 21/343* (2013.01); *G01C 21/3484* (2013.01); *G01C 21/367* (2013.01); *G06F 16/29* (2019.01)

(58) Field of Classification Search
CPC .............. G01C 21/343; G01C 21/3484; G01C 21/367; G01C 21/3697; G06F 16/29
See application file for complete search history.

(56) References Cited

U.S. PATENT DOCUMENTS

| 8,370,062 | B1 | 2/2013 | Starenky et al. |
| 10,126,138 | B1 | 11/2018 | Farmer et al. |
| 2007/0225902 | A1* | 9/2007 | Gretton ............ G08G 1/096883 701/533 |

(Continued)

OTHER PUBLICATIONS

"U.S. Appl. No. 16/271,155, Advisory Action dated Aug. 4, 2021", 4 pgs.

(Continued)

*Primary Examiner* — Rami Khatib
*Assistant Examiner* — Gabriel Joseph Rene Lambert
(74) *Attorney, Agent, or Firm* — SCHWEGMAN LUNDBERG & WOESSNER, P.A.

(57) ABSTRACT

Systems and methods for optimizing issue reporting in a navigation environment are provided. In example embodiments, a networked system causes presentation of a navigation user interface on a user device of a user, whereby the navigation user interface includes a route being navigated and navigation instructions. The networked system also causes presentation of one or more issue icons on the user device, whereby each issue icon represents a different type of issue to be reported. A selection of an issue icon from the one or more issue icons is received by the networked system. In response to receiving the selection of the issue icon, the networked system infers a location associated with the issue. The networked system updates a database with the issue and the inferred location. In some embodiments, the database is updated after the inferred location or the issue is verified.

20 Claims, 10 Drawing Sheets

(56) References Cited

U.S. PATENT DOCUMENTS

| | | | |
|---|---|---|---|
| 2008/0059055 A1 | 3/2008 | Geelen et al. | |
| 2009/0326801 A1 | 12/2009 | Johnson et al. | |
| 2010/0020169 A1* | 1/2010 | Jang | G01C 21/3697 |
| | | | 340/436 |
| 2013/0132434 A1* | 5/2013 | Scofield | G08G 1/0112 |
| | | | 707/E17.014 |
| 2014/0085107 A1* | 3/2014 | Gutierrez | G08G 1/0965 |
| | | | 340/905 |
| 2015/0032366 A1 | 1/2015 | Man et al. | |
| 2015/0153186 A1 | 6/2015 | Geelen et al. | |
| 2016/0021153 A1 | 1/2016 | Hull et al. | |
| 2016/0150070 A1 | 5/2016 | Goren et al. | |
| 2016/0236638 A1* | 8/2016 | Lavie | G08G 1/012 |
| 2017/0069205 A1 | 3/2017 | Nguyen et al. | |
| 2017/0169535 A1* | 6/2017 | Tolkin | G06Q 50/30 |
| 2018/0328747 A1 | 11/2018 | Farmer et al. | |
| 2018/0328748 A1 | 11/2018 | Chachra et al. | |
| 2019/0147260 A1* | 5/2019 | May | B60W 50/14 |
| | | | 382/103 |
| 2020/0256684 A1 | 8/2020 | Rao et al. | |

OTHER PUBLICATIONS

"U.S. Appl. No. 16/271,155, Final Office Action dated Feb. 14, 2022", 38 pgs.

"U.S. Appl. No. 16/271,155, Final Office Action dated May 21, 2021", 39 pgs.

"U.S. Appl. No. 16/271,155, Non Final Office Action dated Jan. 22, 2021", 35 pgs.

"U.S. Appl. No. 16/271,155, Non Final Office Action dated Aug. 17, 2021", 39 pgs.

"U.S. Appl. No. 16/271,155, Notice of Allowance dated Jun. 8, 2022", 10 pgs.

"U.S. Appl. No. 16/271,155, Response filed Apr. 14, 2022 to Final Office Action dated Feb. 14, 2022", 12 pgs.

"U.S. Appl. No. 16/271,155, Response filed Apr. 21, 2021 to Non Final Office Action dated Jan. 22, 2021", 17 pgs.

"U.S. Appl. No. 16/271,155, Response filed Jul. 21, 2021 to Final Office Action dated May 21, 2021", 12 pgs.

"U.S. Appl. No. 16/271,155, Response filed Nov. 16, 2021 to Non Final Office Action dated Aug. 17, 2021", 12 pgs.

* cited by examiner

US 11,879,741 B2

OPTIMIZED ISSUE REPORTING SYSTEM

CLAIM FOR PRIORITY

This application is a continuation of U.S. application Ser. No. 16/271,155, filed Feb. 8, 2019, which is hereby incorporated by reference in its entirety.

TECHNICAL FIELD

The subject matter disclosed herein generally relates to special-purpose machines configured to provide an optimized issue reporting system, and to the technologies by which such special-purpose machines become improved compared to other machines that manage issue reporting. Specifically, the present disclosure addresses systems and methods that uses location inference to optimize reporting of issues in a navigation environment.

BACKGROUND

Conventionally, navigation systems provide a navigable route from a starting point to an end point. However, these conventional navigation systems make it difficult or impossible to report an issue with the route and its navigation instructions. Some conventional systems allow the user to only report traffic, accident, or location of speed traps. Furthermore, these conventional systems require the user to also indicate the severity of the traffic.

BRIEF DESCRIPTION OF THE DRAWINGS

Some embodiments are illustrated by way of example and not limitation in the figures of the accompanying drawings.

DETAILED DESCRIPTION

Figure 1:
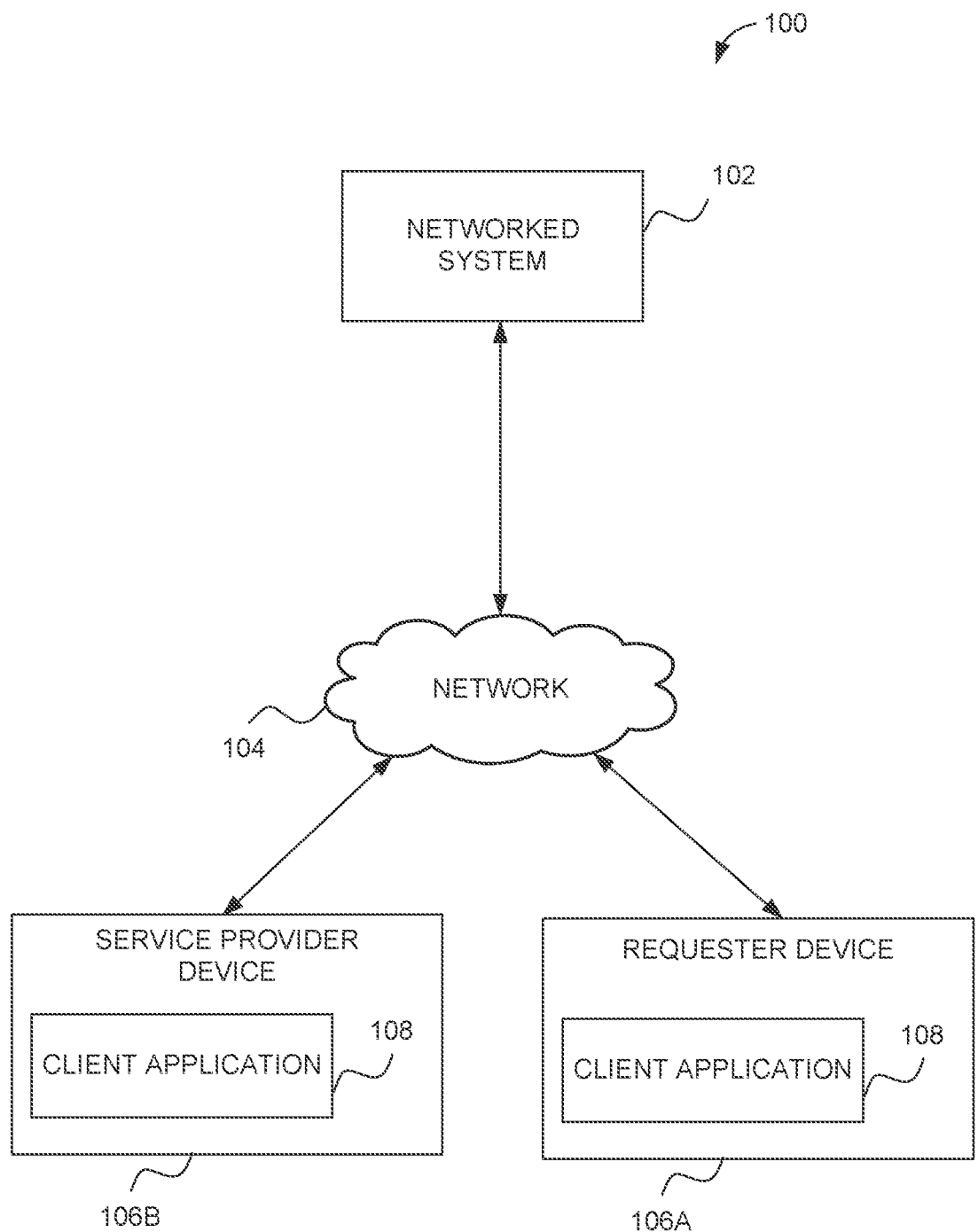
FIG. 1 is a diagram illustrating a network environment suitable for optimizing issue reporting in a navigation environment, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present disclosure provides technical solutions for optimizing issue reporting in a navigation environment. In example embodiments, a networked system causes presentation of a navigation user interface on a user device of a user (e.g., driver or rider), whereby the navigation user interface includes a route being navigated and navigation instructions. The networked system also causes presentation of one or more issue icons on the user device, whereby each issue icon represents a different type of issue to be reported. A selection of an issue icon from the one or more issue icons is received by the networked system. In response to receiving the selection of the issue icon, the networked system infers a location associated with the issue. The networked system updates a database with the issue and the inferred location. In some cases, the database is updated after the inferred location or the issue is verified.

Accordingly, the networked system provides an issue reporting system that requires minimal efforts from the user in order to report and issue. Because the user reporting the issue is likely driving a vehicle, the networked system attempts to make the reporting of the issue simple and with as few inputs (e.g., tap on a screen of the user device) as possible. As such, the networked system infers where a location of an issue may be located or a severity of an issue being reported. In some case, the inferred location may be verified by the user (or other users that have reported issues at the inferred location).

Thus, example methods (e.g., algorithms) and example systems (e.g., special-purpose machines) are configured to improve a navigation process and system by providing an efficient issue reporting system that requires minimum input from a user. Because the user provides minimum input, there is a reduction in communications over a network communicatively coupling a user device of the user with the networked system. Therefore, one or more of the methodologies described herein facilitate solving technical problems associated with issue reporting by using trace data and inference to determine locations where issues are occurring and/or the type of issue being reported.

FIG. 1 is a diagram illustrating a network environment 100 suitable for optimizing issue reporting in a navigation environment, according to example embodiments. In some embodiments, the navigation environment comprises a ride sharing or delivery service that requires a driver to navigate from a pick-up location to a drop-off location. The network environment 100 includes a networked system 102 communicatively coupled via a network 104 to a requester device 106a and a service provider device 106b (collectively referred to as "user devices 106"). In example embodiments, the networked system 102 comprises components that receive reports of issues and obtain, store, and analyze trace data received from the user devices 106 and other sources in order to infer locations where the issue may be located, determine a severity of the issue, and determine whether the reported issue should be verified. The components of the networked system 102 are described in more detail in connection with FIG. 2 and FIG. 3 and may be implemented in a computer system, as described below with respect to FIG. 9.

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the user devices 106 are portable electronic devices such as smartphones, tablet devices, wearable computing devices (e.g., smartwatches), or similar devices. Alternatively, the service provider device 106b can correspond to an on-board computing system of a vehicle. The user devices 106 each comprises one or more processors, memory, touch screen displays, wireless networking system (e.g., IEEE 802.11), cellular telephony support (e.g., LTE/GSM/UMTS/CDMA/HSDP A), and/or location determination capabilities. The user devices 106 interact with the networked system 102 through a client application 108 stored thereon. The client application 108 of the user devices 106 allows for exchange of information with the networked system 102 via user interfaces as well as in background. For example, the client application 108 running on the user devices 106 provides trace data to the networked system 102, via the network 104, for storage and analysis. The trace data includes, for example, location information (e.g., GPS coordinates, current location in latitude and longitude), speed of a vehicle a user is within when navigating a route, and timing information when navigating the route (e.g., time to traverse the route or a portion of the route). The client application 108 also receives information from the networked system 102 and presents the information on various user interfaces. The presented information can include, for example, a navigation route, navigation instructions, issue reporting icons, and verification messages.

In example embodiments, a first user (e.g., a requester) operates the requester device 106a that executes the client application 108 to communicate with the networked system 102 to make a request for a transportation service such as transport or delivery service (referred to collectively as a "trip"). In some embodiments, the client application 108 determines or allows the user to specify a pick-up location (e.g., of the user or an item to be delivered) and to specify a drop-off location for the trip. The client application 108 also presents information, from the networked system 102 via user interfaces, to the user of the requester device 106a. For instance, the user interface can display a request from the networked system 102 to confirm a pick-up level or address, confirm an issue, or confirm a location associated with the issue.

A second user (e.g., a service provider) operates the service provider device 106b to execute the client application 108 that communicates with the networked system 102 to exchange information associated with providing transportation service (e.g., to the user of the requester device 106a). The client application 108 presents information via user interfaces to the user of the service provider device 106b, such as invitations to provide the transportation service, navigation instructions (e.g., maps), and pickup and drop-off locations of people or items. The client application 108 also provides data to the networked system 102 such as a current location (e.g., coordinates such as latitude and longitude) of the service provider device 106b, timing information, and indications reporting or confirming the issue.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 9, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device, and the functions described herein for any single system or device may be subdivided among multiple systems or devices. Additionally, any number of user devices 106 may be embodied within the network environment 100. Furthermore, some components or functions of the network environment 100 may be combined or located elsewhere in the network environment 100. For example, some of the functions of the networked system 102 may be embodied within other systems or devices of the network environment 100. Additionally, some of the functions of the user device 106 may be embodied within the networked system 102. While only a single networked system 102 is shown, alternative embodiments may contemplate having more than one networked system 102 to perform server operations discussed herein for the networked system 102.

Figure 2:
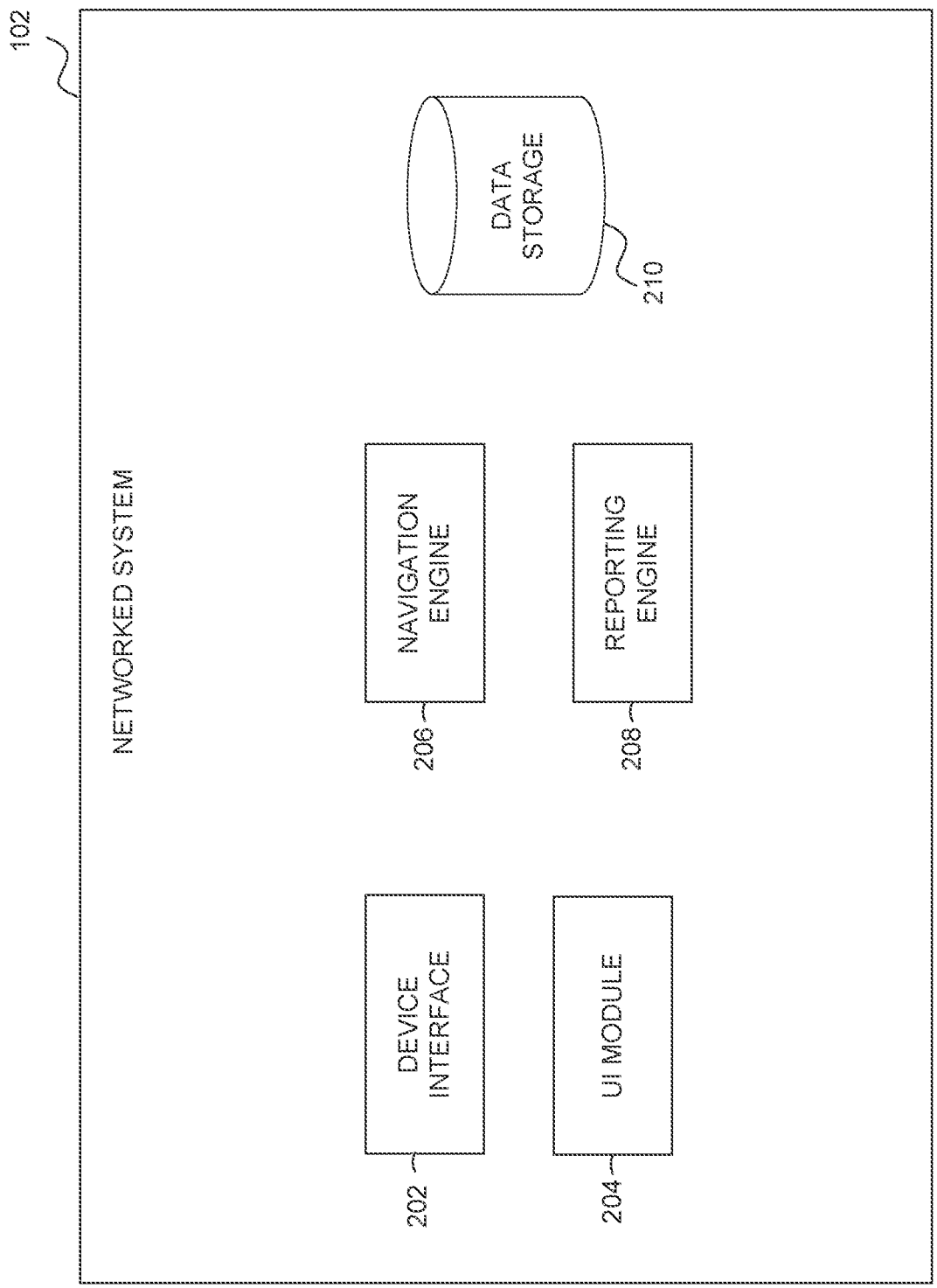
FIG. 2 is a block diagram illustrating components of a networked system for optimizing issue reporting in a navigation environment, according to some example embodiments.

FIG. 2 is a block diagram illustrating components of the networked system 102 for optimizing issue reporting in a navigation environment, according to some example embodiments. In various embodiments, the networked system 102 manages indications of an issues along navigation routes. The networked system 102 also obtains and stores trip data (also referred to herein as "trace data") such as, pick-up and drop-off locations, route taken, locations of user devices received, and speed. In some embodiments, the networked system 102 analyzes the trace data, in response to receiving an indication of an issue, to infer a location where the reported issue is occurring, determine severity, or determine whether to confirm a reported issue. To enable these operations, the networked system 102 comprises a device interface 202, a user interface (UI) module 204, a navigation engine 206, a reporting engine 208, and a data storage 210 all configured to communicate with each other (e.g., via a bus, shared memory, or a switch). The networked system 102 may also comprise other components (not shown) that are not pertinent to example embodiments. Furthermore, any one or more of the components (e.g., engines, interfaces, modules, storage) described herein may be implemented using hardware (e.g., a processor of a machine) or a combination of hardware and software. Moreover, any two or more of these components may be combined into a single component, and the functions described herein for a single component may be subdivided among multiple components.

The device interface 202 is configured to exchange data with the user devices 106 and cause presentation of one or more user interfaces generated by the UI module 204 on the user devices 106 including user interfaces that provide a navigation route and instructions, icons for reporting an issue, and confirmation requests to confirm aspects of the reported issue (e.g., location where the issue occurs). In some embodiments, the device interface 202 generates and transmits instructions (or the user interfaces themselves) to the user devices 106 to cause the user interfaces to be displayed on the user devices 106. The user interfaces can also be used to request transportation service from the requester device 106a and display invitations to provide the transportation service on the service provider device 106b. At least some of the information received from the user devices 106 are stored to the data storage 212, for example, as trace data for each trip.

The UI module 204 manages generation of user interfaces that are presented, via the client application 108, at the user device 106. In example embodiments, the UI module 204 generates and causes presentation of user interfaces (e.g., sends the UI or instructions to generate the UI via the device interface 202) on the user devices. In some embodiments, the UI comprises a navigation UI that includes a route for navigating between two locations (e.g., current location and destination, pick-up location and drop-off location). The navigation UI presents navigation instructions for navigating the route (e.g., instructions to turn, exit, take a particular roadway). In some embodiments, the navigation UI also includes a reporting icon to report an issue along the route.

In some cases, in response to selection of the reporting icon, the UI module 204 presents (e.g., causes presentation on the user device 106) one or more issue icons whereby each issue icon represents a different type of issue to be reported. The types of issue can include, for example, traffic, an accident, a roadway closure, a turn not allowed, a poor pick-up location, a poor drop-off location, missing roadway, incorrect name for roadway, incorrect one-way street, incorrect side of the street, poor parking locations or waiting spots, poor entrances/exits, or illegal stopping zone. In an alternative embodiment, the one or more issue icons are presents on the navigation UI. In other embodiments, there may be no need for the one or more issue icons. Instead, the reporting engine 208 can infer what the type of issue is based on trace data, as will be discussed further below.

The navigation engine 206 manages generation and monitoring of routes between locations (e.g., a current or pick-up location and a drop-off location). In particular, the navigation engine 206 determines a route between the locations and presents turn-by-turn navigation instructions along the route. The route, in the form of a map, and navigation instructions are then presented via the UI module 204 and device interface 202. In example embodiments, the navigation engine 206 monitors a user traversing the route and captures trace data from the monitoring. The trace data can include locations (e.g., latitude and longitude), speed, time, and whether users follow the suggested routes (e.g., followings the navigation instructions).

The reporting engine 208 is configured to manage issue reporting at the networked system 102. In example embodiments, the reporting engine 208 receives indications of issues in the navigation environment, infers one or more locations where the issue may occur for each issue, scores users on their reporting, and determine severity of the issue. The reporting engine 208 will be discussed in more detail in connection with FIG. 3 below.

The data storage 210 is configured to store information associated with each user of the networked system 102. The information includes various trip or trace data, which may be used by the networked system 102 to, for example, infer locations where an issue occurs or verify a reported issue. In some embodiments, the data is stored in or associated with a user profile corresponding to each user and includes a history of interactions using the networked system 102. While the data storage 210 is shown to be embodied within the networked system, alternative embodiments can locate the data storage 210 elsewhere and have the networked system 102 communicatively coupled to the data storage 210.

Figure 3:
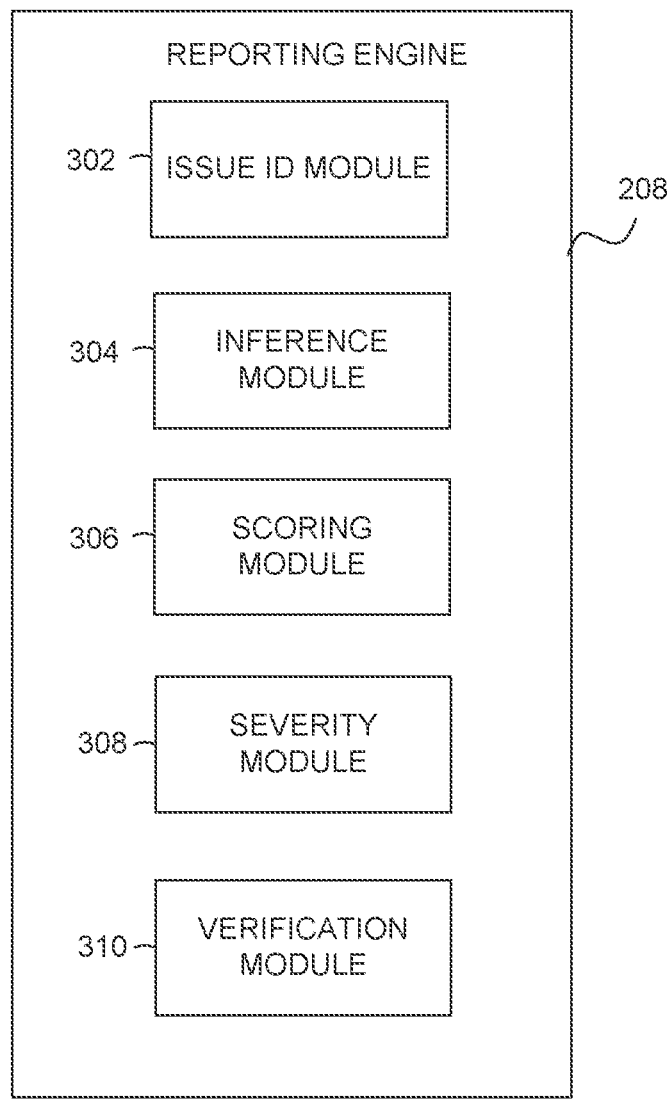
FIG. 3 is a block diagram illustrating components of a reporting engine, according to some example embodiments.

FIG. 3 is a block diagram illustrating components of the reporting engine 208, according to some example embodiments. In example embodiments, the reporting engine 208 is configured to manage issue reporting at the networked system 102. In example embodiments, the reporting engine 208 receives an indication of an issue from a user. In some cases, the indication includes a type of issue being reported. Based on the indication and trace data associated with the user, the reporting engine 208 infers one or more locations where the issue may have occurred. In some cases, the reporting engine 208 scores users on their reporting and uses the scores to determine whether further verification is needed. Further still, the reporting engine 208, in some cases, determines severity of the reported issue based on the trace data. To enable these operations, the reporting engine 208 comprises an inference module 302, a scoring module 304, a severity module 306, and a verification module 308 all configured to communicate with each other (e.g., via a bus, shared memory, or a switch). The reporting engine 208 may also comprise other components (not shown) that are not pertinent to example embodiments.

The issue identification (ID) module 302 detects a type of issue being reported. In some cases, the type of issue is automatically identified based on a selection of an issue icon shown on the user interface of the user. For instance, if the user selects an issue icon labeled "turn not allowed," the issue ID module 302 detects that the issue is that a navigation instruction indicated a turn that is not legal or possible to make. In another example, if the user selects an issue icon labeled "traffic," the issue ID module 302 detects that the user is reporting that there is traffic along the suggested route. Based on the type of issue being reported, one or more of the other components of the reporting engine 208 performs operations. For example, the severity module 308, in some embodiments, is triggered when traffic is being reported. In some embodiments, the issue ID module 302 works with the inference module 304 to detect the type of issue being reported as discussed further below.

The inference module 304 infers one or more locations where an issue being reported may be located. Because the networked system 102 attempts to limit a number of inputs required from a user to report an issue, the inference module 304 determines likely location(s) where the issue occurred. The determination by the inference module 302 is based on one or more signals from the trace data of a current trip and/or previous trips of the user. Such signals include, for example, an average speed, speed at certain locations, turns taken, how long between arriving at a pick-up location and start of a trip, or navigation instructions not followed. The signals may also include data from other users of the networked system 102 and tickets (e.g., reporting issues) filed.

In some embodiments, the inference module 304 uses intelligence to select one or more locations (e.g., roads or streets) where the issue may have occurred. In some cases, the inference module 302 selects a current location (e.g., if the issue is traffic) or a last predetermined number of roads (e.g., last three) that were suggested in the route being navigated (e.g., if the issue is a road closure or a turn not being allowed). In other cases, the inference module 304 analyzes location information (e.g., GPS information), speed of the user when (or shortly prior to when) the issue is reported, and navigation information (e.g., whether the user followed a navigation instruction). For example, if the navigation engine 206 provides a navigation instruction that instructs the user to make a left on Franklin Street, but instead, the user slows down and makes a right or U-turn, the inference module 304 infers that Franklin Street is the likely location where the issue occurred. As a result, the inference module 302 selects Franklin Street as the inferred location.

In other embodiment, the inference module 304 detects that the user is reporting an issue at or near a start of a trip (e.g., near a pick-up location) or after the trip is completed (e.g., near a drop-off location). In this embodiment, the inference module 304 selects the pick-up location or drop-off location as the inferred location. As further confirmation that the inferred location is the pick-up location or the drop-off location, the inference module 304 analyzes whether the user (e.g., driver) was stopped more than a threshold distance from the pick-up location or drop-off location. A result where the user stopped more than the threshold distance would infer that the pick-up location or drop-off location is an illegal stopping zone or has bad traffic.

In a further embodiment, the inference module 304 detects a wait time for the user at an indicated location, whereby the indicated location is a pick-up location. The inference module 304 then determines whether the wait time traverses a predetermined wait time threshold. If the wait time traverses the predetermined wait time threshold, the inference module 304 selects the pick-up location as the inferred location. The inference module 304 may also infer that the type of issue is that the location is difficult for a user to walk to or access.

In another embodiment, the inference module 304 infers the location for a multiple pick-up trip (e.g., a pool trip where a driver picks up and drops off multiple riders along the route). In this embodiment, when the user reports an issue, the inference module 304 accesses trace data for the plurality of pick-up locations. The inference module 304 detects a deviation from an expected wait time or suggested navigation instruction for one of the pick-up locations. Based on the detected deviation, the inference module 304 selects the pick-up location with the deviation as the inferred location.

In some embodiments, the inference module 304 also uses data from other users to select the location(s). In some cases, the inference module 304 accesses data indicating issues reported along the same route or having a same one or more navigation instructions. In other cases, the inference module 302 analyzes a predetermined number of trips (e.g., 1000 trips) where the navigation engine 206 instructed a number of users (e.g., 100 drivers) to perform a particular navigation instruction (e.g., make a left turn at Franklin Street) and no user (or almost no user) followed the instructions. This is a strong indicator that Franklin Street is the location where a turn is not allowed or the street is closed. If the inference module 304 is fairly certain that the location (e.g., Franklin Street) is the location of the issue, the reporting engine 208 may not need to verify the location with the user. In other cases, the verification module 310 causes a verification user interface to be displayed to the user that indicates the one or more inferred locations and requests the user confirm the location (if one inferred location is identified), select the location (if more than one inferred location is selected), or change the location (if no inferred location is correct).

The scoring module 304 generates and maintains a credibility score for each user. The credibility score is a rating assigned to each user based on a number of previous issues reported by the user and accuracy of the previous issues reported. For example, if a user has provided a threshold number of issue reports, the user will have a higher score than a user that has only reported a few issues or inaccurate issues. For instance, a driver or courier that has only done two pool trips (e.g., multiple rider/pick-up location trip) and submits a poor pick-up or drop-off location may be evaluated differently from a driver that has done 100 pool trips. In example embodiments, the issues being reported by users that have a high credibility score can be turned actionable more quickly (e.g., update map data, update the data storage 210) and without further verification. However, issues reported by more novice users having lower scores may need to be followed up with confirmation/verification.

The severity module 308 infers (e.g., determines) a severity of traffic being reported. In example embodiments, the inference is based on a number of users submitting a report, speed of the users (e.g., speed of vehicles the users are traveling in), how long it took to get through a traffic area, or detection of speed increasing or decreasing. As such, the severity module 308 detects a number of users reporting the issue at the inferred location (e.g., current location or area of each user) and accesses trace data for these users including location information and speed. Based on the trace data, the severity module 308 determines a speed or time to travel through the inferred location for each of the users and determines the severity based on the speed or time. For example, if a threshold number or percentage of users have a speed below 10 mph (or an average speed less than 10 mph) and/or takes 30 minutes to travel through a segment of road (or 25 minutes more than the estimated 5 minutes it should take), the traffic may be inferred to be heavy. In contrast, if a threshold number or percentage of users have a speed around 45 mph in a 55 mph zone (or an average speed of all users around 45 mph) and/or takes an extra 5 minutes to travel through a segment of road (compared to estimate time if no traffic), the traffic may be inferred to be low or light.

The verification module 310 manages verification of issues and/or location of an issue being reported. In some embodiments, the verification module 310 receives the one or more inferred locations determined by the inference module 304. The verification module 310, via the user interface module 204, causes presentation of a user interface on the user device 106 that presents the one or more inferred locations and requests the user confirm the inferred location, select one of the inferred locations, or change the inferred location from the one or more that are shown.

In some embodiments, the verification module 310 verifies reported issues using trace data from other users. The verification of reported issues may be triggered, in some cases, based on the reporting user having a low credibility score. In some cases, the verification module accesses trace data for other users that have navigated the same navigation instructions for the inferred location. Using the trace data for the other users, the verification module 310 verifies the issue being reported. The verification module 310 may verify the issue based on the other users also reporting the same issue or based on the other users performing a similar navigation maneuver in response to the navigation instructions (e.g., made a right turn on Franklin Street instead of the navigation instruction of making a left turn).

Figure 4:
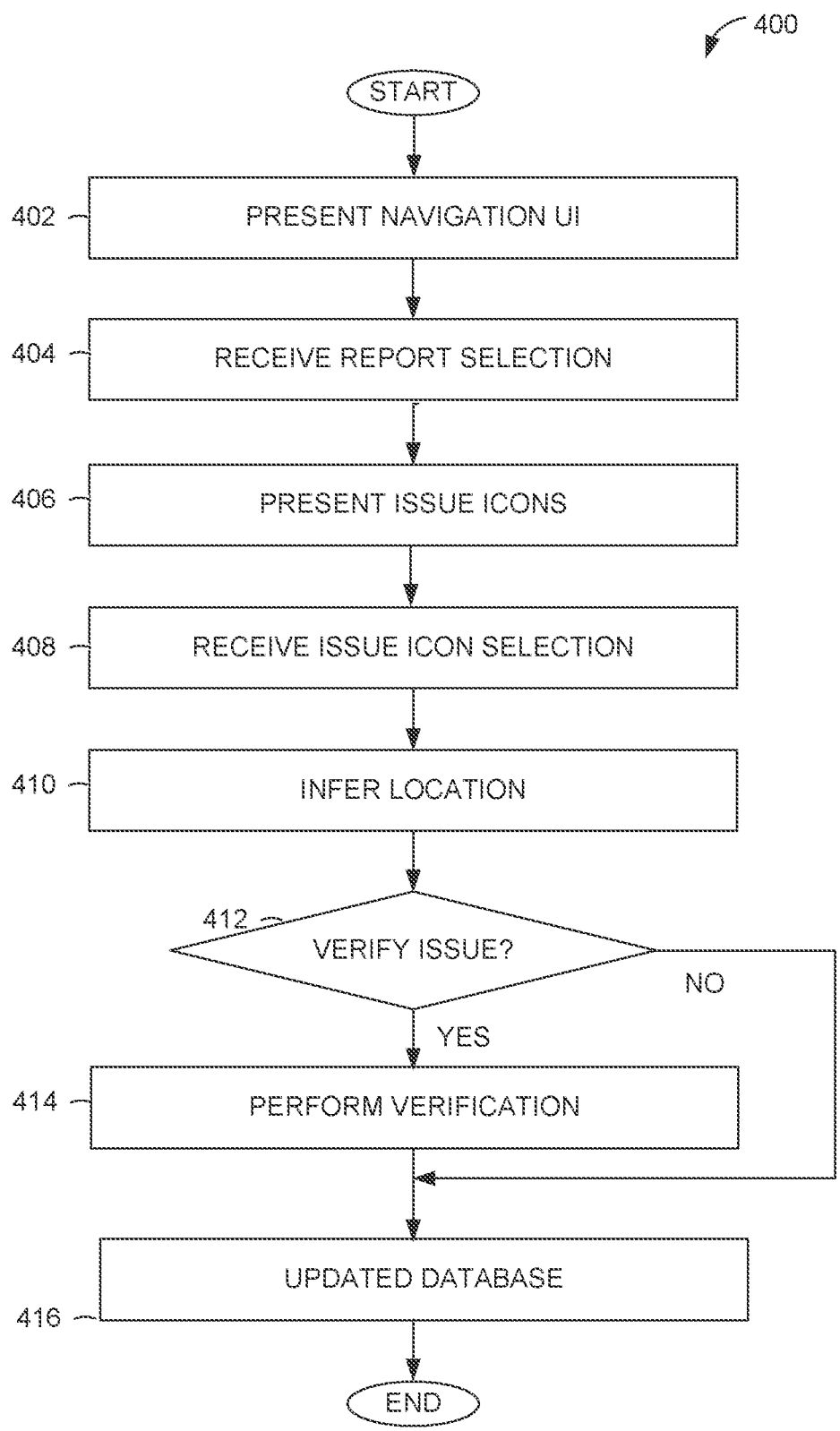
FIG. 4 is a flowchart illustrating operations of a method for optimizing issue reporting in a navigation environment, according to some example embodiments.

FIG. 4 is a flowchart illustrating operations of a method 400 for optimizing issue reporting in a navigation environment, according to some example embodiments. Operations in the method 400 are performed by the networked system 102, using components described above with respect to FIG. 2 and FIG. 3. Accordingly, the method 400 is described by way of example with reference to the networked system 102. However, it shall be appreciated that at least some of the operations of the method 400 may be deployed on various other hardware configurations or be performed by similar components residing elsewhere in the network environment 100. Therefore, the method 400 is not intended to be limited to the networked system 102.

In operation 402, the UI module 204 causes presentation of the navigation UI on the user device 106. The navigation UI includes a route for navigating between two locations (e.g., current location and destination, pick-up location and drop-off location) and navigation instructions for navigating the route (e.g., instructions to turn, exit, take a particular roadway). In some embodiments, the navigation UI also includes a reporting icon to report an issue along the route.

In operation 404, the device interface 202 receives an indication of selection of the reporting icon. The indication triggers the UI module 204 to update the UI or provide a new UI comprising one or more issue icons.

In operation 406, the UI module 204, via the device interface 202, causes presentation of the one or more issue icons in response to the indication of the selection of the reporting icon. Each issue icon represents a different type of issue to be reported. In alternative embodiments, the one or more issue icons are presented on the navigation UI in operation 402 or are not necessary in cases where the networked system 102 infers both the location and the issue or the reporting icon indicates the issue. In these embodiments, operations 404 and 406 are optional.

In operation 408, the device interface 202 receives an indication of selection of one of the presented issue icons. The receiving of the indication triggers the reporting engine 208 to perform its operations. In some embodiments, the issue identification (ID) module 302 detects a type of issue being reported. In some cases, the type of issue is automatically identified based on a selection of an issue icon shown on the user interface of the user. In other embodiments, the inference module 304 may infer the type of issue being reported.

In operation 410, the inference module 304 infers a location associated with the issue being reported. Operation 410 will be discussed in more detail in connection with FIG. 5 below.

In operation 412, a determination is made as to whether the reported issue needs to be verified. Operation 412 will be discussed in more detail in connection with FIG. 6 below.

If the reported issue needs to be verified, the method 400 proceeds to operation 414 where the verification module 310 performs the verification. In some embodiments, the verification module 310 receives the inferred location determined by the inference module 304 and the type of issue being reported determined by the issue ID module 302. The verification module 310 determines, based on stored trace data or historical data, whether other users have reported the same issue at the same inferred location. In some embodiments, if a threshold number or percentage of other users have reported the same issue at the same inferred location, then the reported issue from the user is verified. Further still, the verification module 310 can query other users in real-time along a similar route to verify a reported issue. For example, a message (e.g., "traffic moving slow?") may be presented on user interfaces of other users (e.g., drivers or riders) asking if the issue is occurring. The other users can provide, via a single tap on the user interface, a response to the query.

In operation 416, the reporting engine 208 updates a database storing issue reports with the newly reported issue. The updating occurs after verification when required or after the determination that the reported issue does not need to be verified. The updated database is used to generate or update routes. As such, if a reported issue occurs often, the navigation engine 206 may stop providing navigation instructions that involve the inferred location with the reported issues.

Figure 5:
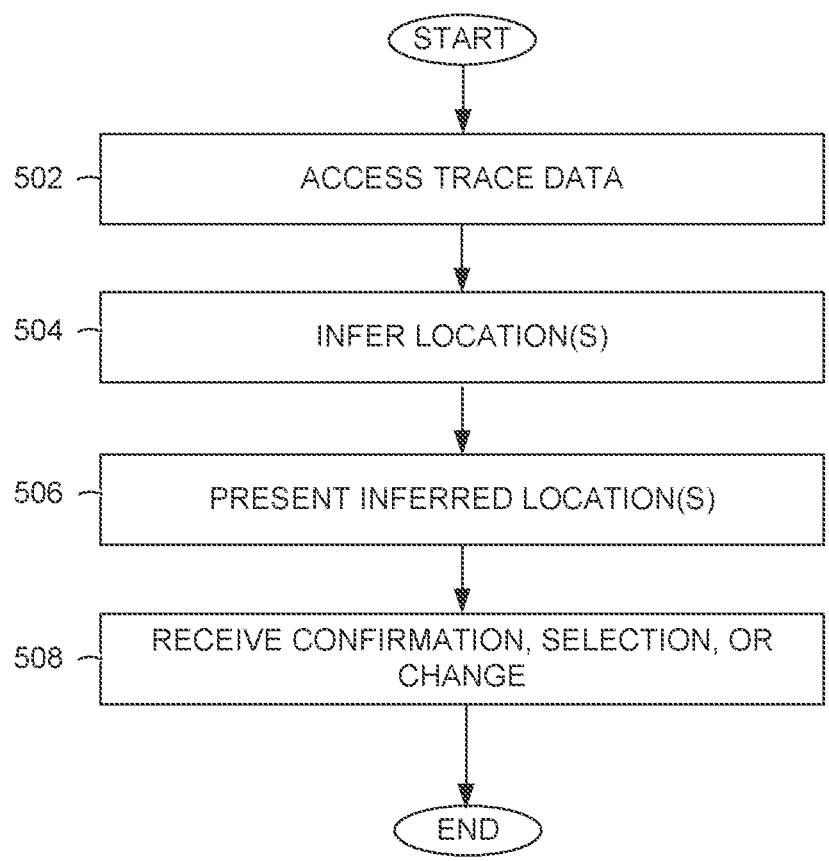
FIG. 5 is a flowchart illustrating operations of a method for inferring a location associated with an issue being reported, according to some example embodiments.

FIG. 5 is a flowchart illustrating operations of a method 500 for inferring a location associated with an issue being reported, according to some example embodiments. Operations in the method 500 are performed by the networked system 102, using components described above with respect to FIG. 2 and FIG. 3. Accordingly, the method 500 is described by way of example with reference to the networked system 102. However, it shall be appreciated that at least some of the operations of the method 500 may be deployed on various other hardware configurations or be performed by similar components residing elsewhere in the network environment 100. Therefore, the method 500 is not intended to be limited to the networked system 102.

In operation 502, the inference module 304 accesses trace data. The trace data comprises the trace data (current and possibly previously recorded) for the user reporting the issue and includes, for example, location information, speed, timing information, and whether navigation instructions were followed. In some cases, trace data (current or previously recorded) for other users may also be accessed.

In operation 504, the inference module 304 infers one or more locations associated with the reported issue. In some embodiments, the inference module 304 uses intelligence to select the inferred locations. In some cases, the inference module 302 selects a current location or a last predetermined number of roads that were suggested in the route being navigated. In other cases, the inference module 304 analyzes the location information (e.g., GPS information), speed of the user when (or prior to when) the issue is reported, or navigation information (e.g., whether the user followed a navigation instruction). If the navigation engine 206 provides a navigation instruction that instructs the user to perform a navigation maneuver (e.g., turn left at Franklin Street), but instead, the user performs a different navigation maneuver (e.g., slows down and makes a right), the inference module 304 infers this location (e.g., Franklin Street)

where the deviation from the navigation instruction is made as the location where the issue occurs.

In other embodiments, the inference module 304 detects that the user is reporting an issue at or near a start of a trip (e.g., near a pick-up location) or after the trip is completed (e.g., near a drop-off location). In these embodiments, the inference module 304 selects the pick-up location or drop-off location as the inferred location.

In a further embodiment, the inference module 304 detects a wait time for the user at a pick-up location. The inference module 304 then determines whether the wait time traverses a predetermined wait time threshold. If the wait time traverses the predetermined wait time threshold, the inference module 304 selects the pick-up location as the inferred location. The inference module 304 may also infer that the type of issue is that the location is difficult for a user to walk to or access.

In another embodiment, the inference module 304 infers the location for a multiple pick-up trip (e.g., a pool trip where a driver picks up and drops off multiple riders along the route). In this embodiment, when the user reports an issue, the inference module 304 analyzes the trace data for the plurality of pick-up locations. The inference module 304 detects a deviation from an expected wait time or suggested navigation instruction for one of the pick-up locations. Based on the detected deviation, the inference module 304 selects the pick-up location with the deviation as the inferred location.

In some embodiments, the inference module 304 also uses data from other users to infer the location(s). In some cases, the accessed data indicates issues reported along the same route or having a same one or more navigation instructions. In other cases, the inference module 302 analyzes a predetermined number of trips where the navigation engine 206 instructed a number of users to perform a particular navigation instruction and no user (or almost no user) followed the instructions. This is a strong indicator that a location where the users deviated from the navigation instruction is the inferred location.

In operation 506, the verification module 310, via the UI module 204, causes presentation of the inferred location(s) to the user reporting the issue for confirmation. The inferred locations are presented on a verification user interface that requests the user confirm the location, select the location (when more than one location is presented), or change the location (if no presented location is correct). Changing the location may cause a further user interface to be presented where the user can enter the location where the issue occurred.

In some embodiments, however, if the inference module 304 is fairly certain that the inferred location is the location of the issue, the reporting engine 208 does not need to verify the location with the user. Certainty can be based on a user credibility score or on a threshold number or percentage of other users reporting the same issue. Thus, operation 506 may be optional.

In operation 508, the verification module 310 receives the confirmation, the selected location, or the changed location. The reported issue is associated with the inferred location and used to update the database in operation 416.

Figure 6:
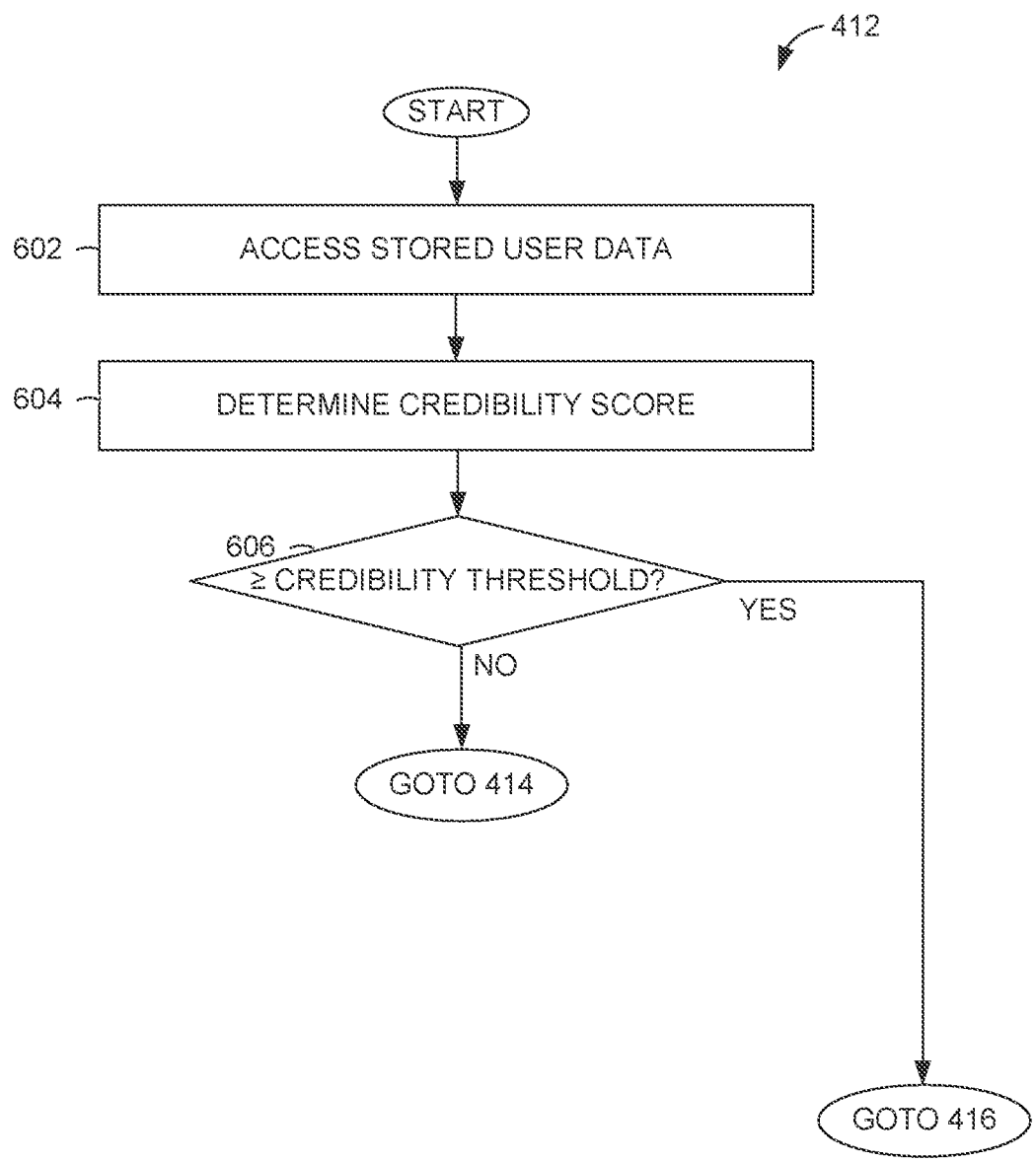
FIG. 6 is a flowchart illustrating operations of a method for determining whether to verify the reported issue, according to some example embodiments.

FIG. 6 is a flowchart illustrating operations of a method 600 (e.g., operation 412) for determining whether to verify the reported issue, according to some example embodiments. Operations in the method 600 are performed by the networked system 102, using components described above with respect to FIG. 2 and FIG. 3. Accordingly, the method 600 is described by way of example with reference to the networked system 102. However, it shall be appreciated that at least some of the operations of the method 600 may be deployed on various other hardware configurations or be performed by similar components residing elsewhere in the network environment 100. Therefore, the method 600 is not intended to be limited to the networked system 102.

In operation 602, the reporting engine 208 accesses stored user data (e.g., associated with an account of the user) for the user reporting the issue. The stored user data includes, for example, number of trips taken using the networked system 102, number of previously reported issues, and accuracy of the previously reported issues.

In operation 604, the scoring module 306 determines the credibility score for the user. The credibility score is a rating assigned to the user based on a number of previous issues reported by the user and accuracy of the previous reported issues. For example, if a user has provided a threshold number of issue reports that are accurate, the user will have a higher score than a user that has only reported a few issues or inaccurate issues. For instance, a driver or courier that has only reported two issues will have a lower credibility score and their reported issues evaluated differently from a driver that has reported 50 issues and was accurate 95% of the time. Other factors the scoring module 306 considers when generating the credibility score includes one or more of familiarity with local area (e.g., number of trips in a location or on a street), length of time the user has been using the networked system 102, number of times the user has received commendations from other users, and an overall user rating.

In operation 606, a determination is made as to whether the credibility score is greater than or equal to a credibility threshold. If the credibility score satisfies the credibility threshold, then the method 600 returns to operation 416 where the database is updated with the reported issue. In example embodiments, issues being reported by users that have a high credibility score can be turned actionable more quickly (e.g., update map data, update the data store) and without further verification.

If the credibility score does not equal or exceed the credibility threshold, the method 412 returns to operation 414 where the verification operation is performed.

Figure 7:
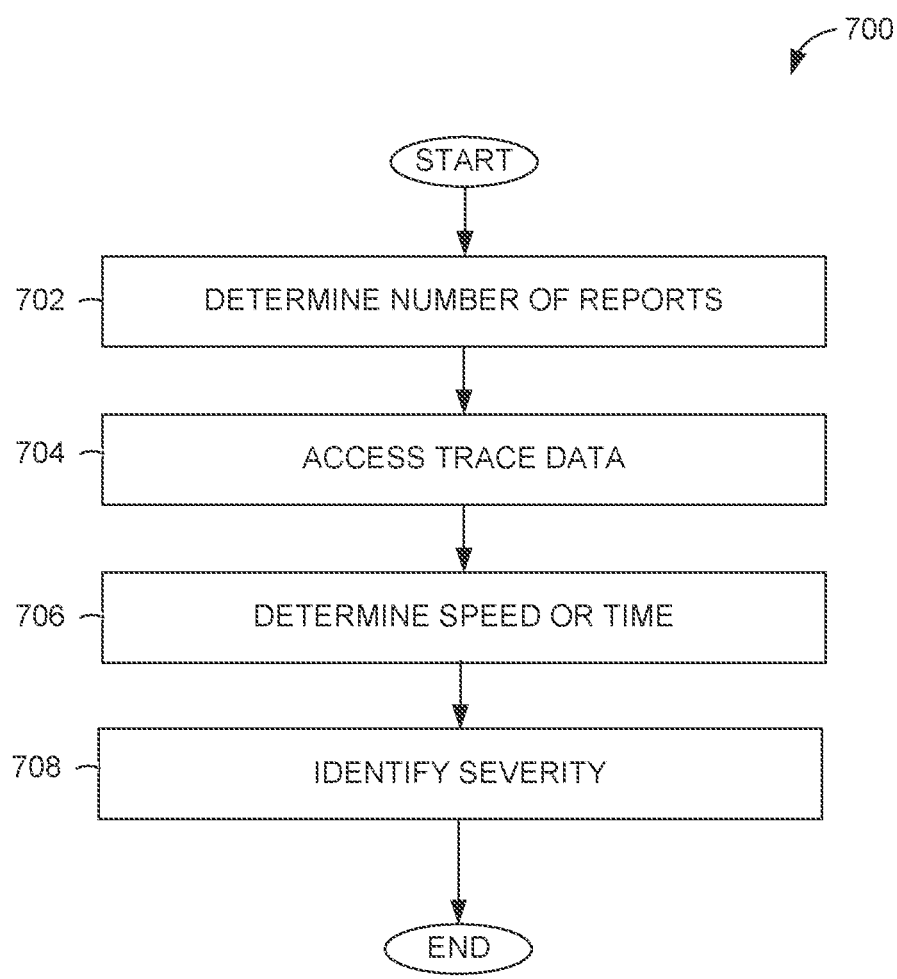
FIG. 7 is a flowchart illustrating operations of a method for determining a severity of the reported issue, according to some example embodiments.

FIG. 7 is a flowchart illustrating operations of a method 700 for determining a severity of the reported issue, according to some example embodiments. In some embodiments, the reported issue is traffic. Operations in the method 700 are performed by the networked system 102, using components described above with respect to FIG. 2 and FIG. 3. Accordingly, the method 700 is described by way of example with reference to the networked system 102. However, it shall be appreciated that at least some of the operations of the method 700 may be deployed on various other hardware configurations or be performed by similar components residing elsewhere in the network environment 100. Therefore, the method 700 is not intended to be limited to the networked system 102.

In operation 702, the severity module 308 determines a number of reports reporting issues of the same issue type (e.g., bad traffic) at or near the same inferred location. In some cases, the inferred location comprises a segment of roadway (e.g., a part of a highway or freeway; one or more city blocks).

In operation 704, the severity module 308 accesses trace data for the users reporting the same issue at the same inferred location. The trace data includes, for example, speed of each user (e.g., speed of vehicles the users are traveling in) and how long it took each user to get through the inferred location (e.g., a portion of road where the traffic is bad).

In operation 706, the severity module 308 determines speed and/or time for each user to travel through the inferred location. In some case, the length of time it takes to traverse the inferred location is monitored by the networked system 102 and captured as part of the trace data. In other cases, a time at a beginning and end of the inferred location is detected and a difference in the time it takes to traverse the inferred location is determined.

In some embodiments, the severity module 308 determines the speed (e.g., average speed) that each user traverse the inferred location based on the trace data directly (e.g., the trace data includes the speed). In other embodiments, the severity module 308 detects a distance traveled over a time period to derive the speed. Further still, the severity module 308 can detect if the speed is increasing or reaching the speed limit for the area. Such a detection indicates that the bad traffic has subsided or the user is no longer in the inferred location where the issue is occurring. Similarly, the severity module 308 can detect if the speed is decreasing or approaches zero for the area.

In operation 708, severity module 308 identifies a severity of the reported issue. In some embodiments, the severity module 308 compares the average speed (of all the users reporting the issue) to an expected speed to determine the severity. In some embodiments, the severity module 308 detects hard braking and/or a comparison of location information and distance traveled over a particular time period after the user has reported the issue to determine severity. In other embodiments, the severity module 308 compares an average time to an expected time to traverse the inferred location in determining the severity. For example, assuming the issue type is (bad) traffic, the severity may be low traffic (e.g., less than a 10 minute delay; speeds 15% less than normal), medium traffic (e.g., between 10-20 minute delay; speeds 15-40% less than normal) or heavy traffic (e.g., greater than 20 minute delay; speeds >40% less than normal). The inferred severity is associated with the reported issue and used to update the database. In some embodiments, the navigation engine 206 may, there soon after, update routes of further users to avoid the area with the bad traffic.

Figure 8B:
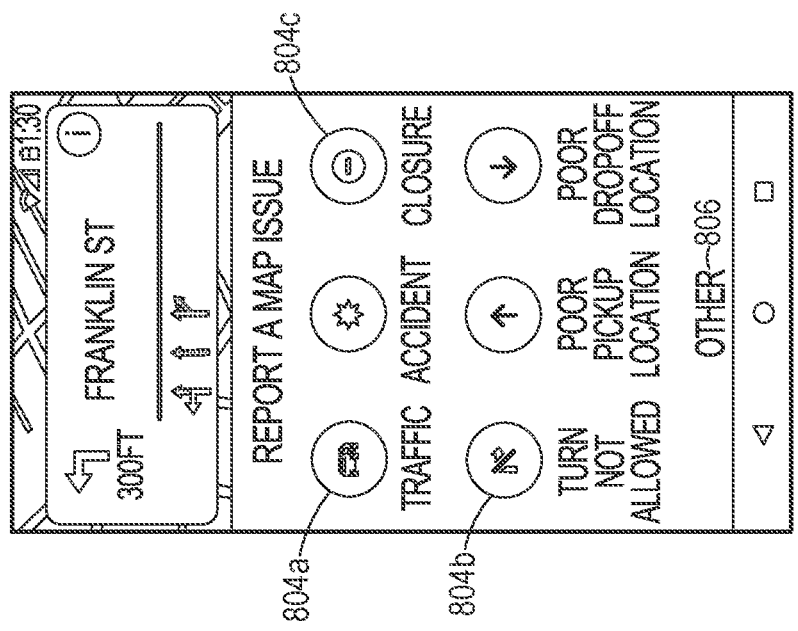
FIG. 8A-FIG. 8D are example screen shots of user interfaces for reporting the issue in the navigation environment.
Figure 8A:
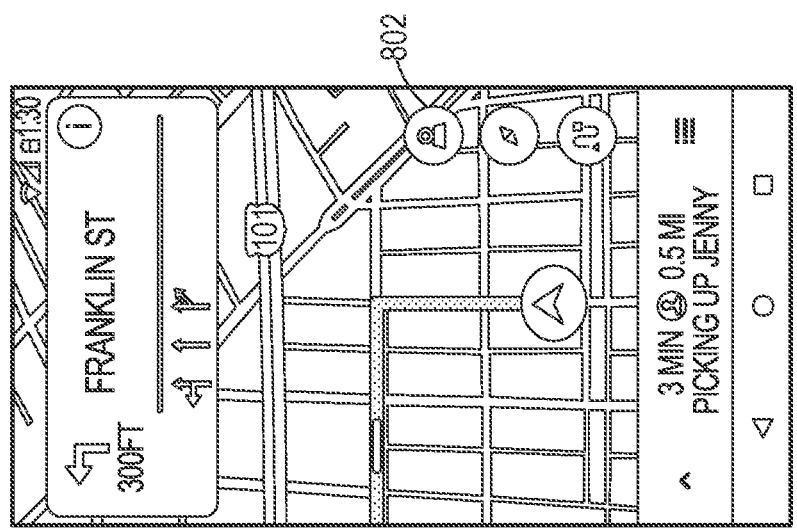

FIG. 8A-FIG. 8D are example screen shots of user interfaces for reporting an issue in a navigation environment that are displayed on the user device 106. FIG. 8A shows an example navigation UI. As shown, the navigation UI displays a map of a route being traversed by the user. In the embodiment shown, the navigation UI includes a reporting icon 802. By tapping on the reporting icon 802, the user can report an issue along the route. Ideally, the user reports the issue as the user encounters the issue thus allowing the inference module 304 to select a last location as the inferred location. However, the networked system 102 can infer other locations where the issue may have occurred prior to a current or last location traversed by the user.

In response to the selection of the reporting icon 802, an issue user interface (UI), as shown in FIG. 8B, is displayed on the user device 106. The issue UI presents one or more issue icons 804 from which the user can select, whereby each issue icon represents a different type of issue being reported. In the example shown in FIG. 8B, the issue icons allow reporting of traffic, an accident, a road closure, a turn not being allowed, a poor pick-up location or a poor drop-off location. Other issue icons can be presented in other embodiments including, for example, missing roadway, incorrect name for roadway, illegal stopping zone, poor parking location (e.g., to pick up or drop off an item for delivery), poor entrances and exits for locations (e.g., restaurants), incorrect one-way street, or wrong side of the road. In some cases, some of other issue icons may be presented on a subsequent user interface (e.g., by the user selecting the "other" selection 806) or are presented in place of the issue icons shown in FIG. 8B.

While embodiments discussed above are directed to reporting issues, alternatively, the issue UI could also be used to report a good location. For example, the user may want to report a good parking location, waiting area (e.g., to pick up a rider or items for delivery such as food), or entrances/exits for locations (e.g., restaurants, apartment complexes).

Figure 8D:
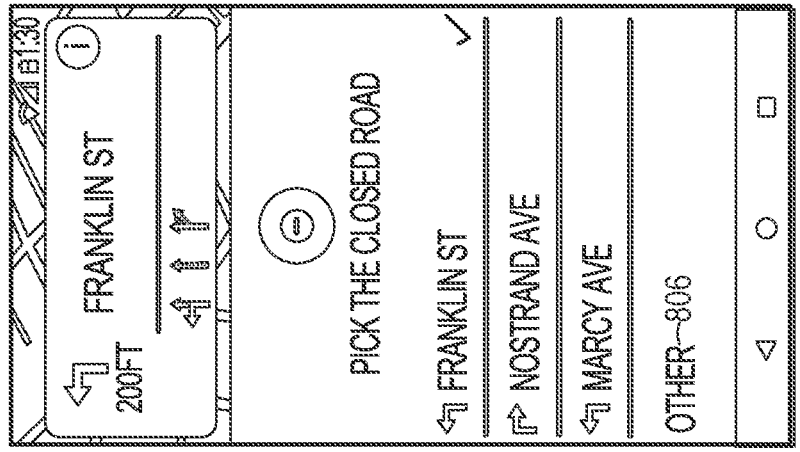
Figure 8C:
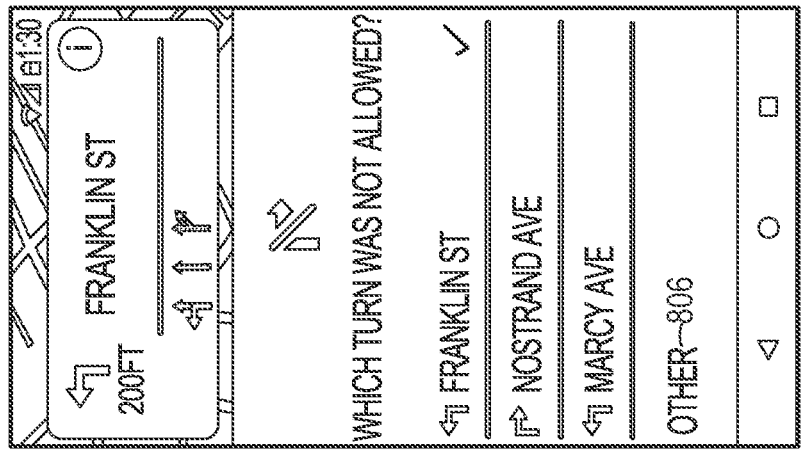

In the case where the user selects the "turn not allowed" icon 804b, the example screen shot of FIG. 8C may be presented. In embodiments, where the networked system 102 wants the user to confirm the inferred location, the networked system 102 presents the screen shot of FIG. 8C listing one or more inferred locations. The user can select one of the inferred locations by tapping on the selected location (shown with a checkmark) or confirm the inferred location if only one location is listed. If none of the listed locations are correct, the user can tap the "other" selection 806. The selection of the "other" selection 806 causes a user interface to be provided where the user can specify the location.

In the case where the user selects the "closure" icon 806c, the user interface shown in FIG. 8D may be displayed on the user device 106. Similar to the UI for a navigation instruction where a turn is not allowed (of FIG. 8C), the UI of FIG. 8D lists one or more inferred locations where the road closure may have occurred. The user can select one of the inferred locations by tapping on the selected location (shown with a checkmark) or confirm the inferred location if only one location is listed. If none of the listed locations are correct, the user can tap the "other" selection 806. The selection of the "other" selection 806 causes a user interface to be provided where the user can specify the location. Similar user interfaces as those shown in FIG. 8C and FIG. 8D may be presented in response to selection of other issue icons 804.

Figure 9:
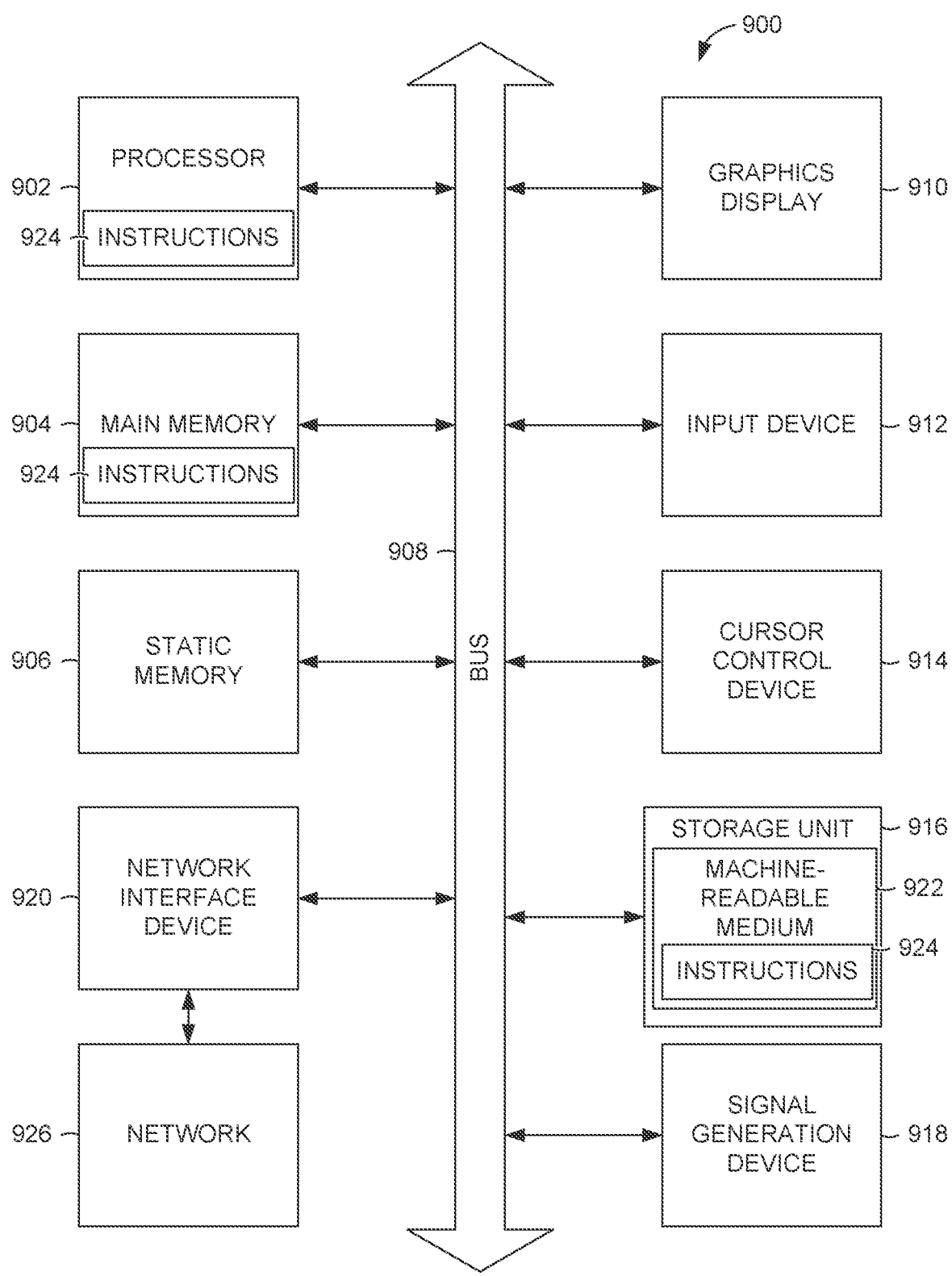
FIG. 9 is a block diagram illustrating components of a machine, according to some example embodiments, able to read instructions from a machine-readable medium and perform any one or more of the methodologies discussed herein.

FIG. 9 illustrates components of a machine 900, according to some example embodiments, that is able to read instructions from a machine-readable medium (e.g., a machine-readable storage device, a non-transitory machine-readable storage medium, a computer-readable storage medium, or any suitable combination thereof) and perform any one or more of the methodologies discussed herein. Specifically, FIG. 9 shows a diagrammatic representation of the machine 900 in the example form of a computer device (e.g., a computer) and within which instructions 924 (e.g., software, a program, an application, an applet, an app, or other executable code) for causing the machine 900 to perform any one or more of the methodologies discussed herein may be executed, in whole or in part.

For example, the instructions 924 may cause the machine 900 to execute the flow diagrams of FIGS. 4-7. In one embodiment, the instructions 924 can transform the general, non-programmed machine 900 into a particular machine (e.g., specially configured machine) programmed to carry out the described and illustrated functions in the manner described.

In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924 (sequentially or otherwise) that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The processor 902 may contain microcircuits that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein.

The machine 900 may further include a graphics display 910 (e.g., a plasma display panel (PDP), a light emitting diode (LED) display, a liquid crystal display (LCD), a projector, or a cathode ray tube (CRT), or any other display capable of displaying graphics or video). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a sound card, an amplifier, a speaker, a headphone jack, or any suitable combination thereof), and a network interface device 920.

The storage unit 916 includes a machine-readable medium 922 (e.g., a tangible machine-readable storage medium) on which is stored the instructions 924 (e.g., software) embodying any one or more of the methodologies or functions described herein. The instructions 924 may also reside, completely or at least partially, within the main memory 904, within the processor 902 (e.g., within the processor's cache memory), or both, before or during execution thereof by the machine 900. Accordingly, the main memory 904 and the processor 902 may be considered as machine-readable media (e.g., tangible and non-transitory machine-readable media). The instructions 924 may be transmitted or received over a network 926 via the network interface device 920.

In some example embodiments, the machine 900 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 904, 906, and/or memory of the processor(s) 902) and/or storage unit 916 may store one or more sets of instructions and data structures (e.g., software) 924 embodying or utilized by any one or more of the methodologies or functions described herein. These instructions, when executed by processor(s) 902 cause various operations to implement the disclosed embodiments.

As used herein, the terms "machine-storage medium," "device-storage medium," "computer-storage medium" (referred to collectively as "machine-storage medium 922") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 922 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 922 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 924 may further be transmitted or received over a communications network 926 using a transmission medium via the network interface device 920 and utilizing any one of a number of well-known transfer protocols (e.g., HTTP). Examples of communication networks 926 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 924 for execution by the machine 900, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for optimizing issue reporting. The method comprises causing presentation of a navigation user interface on a user device of a user, the navigation user interface including a route being navigated and navigation instructions; causing presentation of one or more issue icons on the user device, each issue icon representing a different type of issue to be reported; receiving, by a networked system, a selection of an issue icon from the one or more issue icons; in response to receiving the selection of the issue icon, inferring, by a hardware processor of the networked system, a location associated with the issue; and updating a database with the issue and the inferred location.

In example 2, the subject matter of example 1 can optionally include wherein the navigation user interface includes a reporting icon to report an issue along the route; and a selection of the reporting icon causing presentation of the one or more issue icons.

In example 3, the subject matter of examples 1-2 can optionally include wherein the inferring comprises selecting a predetermined number of locations previously traversed along the route, the inferred location being one of the predetermined number of locations, the method further comprising causing presentation of the predetermined number of locations; and requesting the user confirm the inferred location from the predetermined number of locations.

In example 4, the subject matter of examples 1-3 can optionally include wherein the inferring comprises accessing trace data received from the user device, the trace data including location information and speed; and identifying a location where the user reduced their speed and did not follow one of the navigation instructions, the location where the user reduced their speed being the inferred location.

In example 5, the subject matter of examples 1-4 can optionally include wherein the inferring comprises accessing historical data of reported issues; and detecting, from the historical data, locations along the route having reported issues, the inferred location being selected from one of the locations along the route.

In example 6, the subject matter of examples 1-5 can optionally include wherein the inferring comprises accessing stored trace data from a plurality of users that traversed a same or similar route; and detecting a location where a predetermined number of the plurality of users do not perform one of the navigation instructions, the location being the inferred location.

In example 7, the subject matter of examples 1-6 can optionally include maintaining a credibility score for each user, the credibility score being based on a number of previous issues reported by the user and accuracy of the previous issues reported; determining that the credibility score is below a credibility threshold; and in response to the credibility score being below the credibility threshold, confirming the reported issue.

In example 8, the subject matter of examples 1-7 can optionally include wherein the inferring comprises identifying an indicated location for the route, the indicated location being a pickup or drop off; detecting that the user stopped more than a threshold distance from the indicated location; and selecting the indicated location as the inferred location.

In example 9, the subject matter of examples 1-8 can optionally include detecting a number of users, including the user, reporting the issue at the inferred location; accessing trace data for the number of users; based on the trace data, determining a speed and time to travel through the inferred location for each of the number of users; and based on the speed and time to travel, determining a severity of the issue.

In example 10, the subject matter of examples 1-9 can optionally include accessing trace data for other users near the inferred location; and using the trace data for the other users, verifying the issue being reported.

In example 11, the subject matter of examples 1-10 can optionally include wherein the inferring comprises for a multiple pick-up trip, accessing trace data for a plurality of pick-up locations; detecting a deviation from an expected wait time or suggested navigation instruction for one of the plurality of pick-up locations; and selecting the one of the plurality of pick-up locations as the inferred location.

In example 12, the subject matter of examples 1-11 can optionally include wherein the user is a driver or a rider in a ride sharing environment.

In example 13, the subject matter of examples 1-12 can optionally include wherein the inferring comprises detecting a wait time for the user at a pick-up location; determining whether the wait time traverses a predetermined wait time threshold; and in response to the wait time traversing the predetermined wait time threshold, selecting the pick-up location as the inferred location Example 14 is a system for optimizing issue reporting. The system includes one or more processors and a storage device storing instructions that, when executed by the one or more hardware processors, causes the one or more hardware processors to perform operations comprising causing presentation of a navigation user interface on a user device of a user, the navigation user interface including a route being navigated and navigation instructions; causing presentation of one or more issue icons on the user device, each issue icon representing a different type of issue to be reported; receiving a selection of an issue icon from the one or more issue icons; in response to receiving the selection of the issue icon, inferring a location associated with the issue; and updating a database with the issue and the inferred location In example 15, the subject matter of example 14 can optionally include wherein the inferring comprises accessing trace data received from the user device, the trace data including location information and speed; and identifying a location where the user reduced their speed and did not follow one of the navigation instructions, the location where the user reduced their speed being the inferred location.

In example 16, the subject matter of examples 14-15 can optionally include wherein the inferring comprises accessing stored trace data from a plurality of users that traversed a same or similar route; and detecting a location where a predetermined number of the plurality of users do not perform one of the navigation instructions, the location being the inferred location.

In example 17, the subject matter of examples 14-16 can optionally include maintaining a credibility score for each user, the credibility score being based on a number of previous issues reported by the user and accuracy of the previous issues reported; determining that the credibility score is below a credibility threshold; and in response to the credibility score being below the credibility threshold, confirming the reported issue.

In example 18, the subject matter of examples 14-17 can optionally include wherein the inferring comprises identifying an indicated location for the route, the indicated location being a pickup or drop off; detecting that the user stopped more than a threshold distance from the indicated location; and selecting the indicated location as the inferred location.

In example 19, the subject matter of examples 14-17 can optionally include detecting a number of users, including the user, reporting the issue at the inferred location; accessing trace data for the number of users; based on the trace data, determining a speed and time to travel through the inferred location for each of the number of users; and based on the speed and time to travel, determining a severity of the issue.

Example 20 is a machine-storage medium for optimizing issue reporting. The machine-storage medium configures one or more processors to perform operations comprising causing presentation of a navigation user interface on a user device of a user, the navigation user interface including a route being navigated and navigation instructions; causing presentation of one or more issue icons on the user device, each issue icon representing a different type of issue to be reported; receiving a selection of an issue icon from the one or more issue icons; in response to receiving the selection of the issue icon, inferring a location associated with the issue; and updating a database with the issue and the inferred location.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
    capturing, by a network system, trace data of a plurality of users traversing routes by monitoring user devices of the plurality of users;
    causing, by a device interface of the network system, presentation of a navigation user interface on a user device of a user;
    receiving, by the network system via the navigation user interface, an indication of an issue based on a selection of an icon presented on the navigation user interface that corresponds to the issue being reported;
    in response to receiving the indication, determining, based on an issue type corresponding to the selected icon, to trigger a severity analysis that determines a severity of the issue, the severity analysis comprising:
        accessing, by the network system, the trace data captured by the network system for user devices reporting the issue at a location associated with the issue;
        determining, by the network system and based on the trace data, a speed or time to travel through the location for each of the user devices; and
        determining, by the network system, the severity of the issue based on the speed or time to travel; and
    updating, by the network system, a database with the issue, the location, and the severity of the issue.

2. The method of claim 1, wherein the location is an inferred location and the method further comprises identifying the inferred location associated with the issue.

3. The method of claim 2, wherein the identifying the inferred location comprises selecting a predetermined number of locations previously traversed along a route being navigated by the user, the inferred location being one of the predetermined number of locations.

4. The method of claim 3, further comprising:
    causing presentation of the predetermined number of locations on the user device; and
    requesting the user confirm the inferred location from the predetermined number of locations.

5. The method of claim 2, wherein the identifying the inferred location comprises:
    accessing the trace data received from the user device, the trace data indicating location information and speed of the user; and
    identifying a locale where the user reduced their speed and deviated from navigation instructions, the locale where the user reduced their speed and deviated from the navigation instructions being the inferred location.

6. The method of claim 2, wherein the identifying the inferred location comprises:
   accessing historical data of reported issues; and
   detecting, from the historical data, locations along a route being navigated by the user having the reported issue, the inferred location being selected from one of the locations along the route.

7. The method of claim 2, wherein the identifying the inferred location comprises:
   accessing the trace data from a plurality of users that traversed a same or similar route being navigated by the user; and
   detecting a locale where a predetermined number of the plurality of users deviated from navigation instructions, the locale where the predetermined number of the plurality of users deviated from the navigation instructions being the inferred location.

8. The method of claim 2, wherein the identifying the inferred location comprises:
   identifying an indicated location for a route being navigated by the user, the indicated location being a pickup or drop off location;
   detecting that the user stopped more than a threshold distance from the indicated location; and
   selecting the indicated location as the inferred location.

9. The method of claim 2, wherein the identifying the inferred location comprises:
   for a multiple pick-up trip, accessing the trace data for a plurality of pick-up locations;
   detecting a deviation from an expected wait time or suggested navigation instruction for one of the plurality of pick-up locations; and
   selecting the one of the plurality of pick-up locations as the inferred location.

10. The method of claim 2, wherein the identifying the inferred location comprises:
    detecting a wait time for the user at a pick-up location;
    determining whether the wait time traverses a predetermined wait time threshold; and
    in response to the wait time traversing the predetermined wait time threshold, selecting the pick-up location as the inferred location.

11. The method of claim 1, further comprising:
    accessing the trace data for other users near the location; and
    using the trace data for the other users, verifying the issue being reported at the location based on a threshold number or percentage of the other users reporting the issue.

12. The method of claim 1, wherein the causing presentation of the navigation user interface on the user device of the user includes causing presentation of one or more issue icons, each issue icon representing a different issue type to be reported, the icon for reporting the issue being selected from the one or more issue icons presented on the navigation user interface.

13. The method of claim 1, further comprising:
    maintaining a credibility score for the user, the credibility score being based on a number of previous issues reported by the user and accuracy of the previous issues reported;
    determining that the credibility score is below a credibility threshold; and
    in response to the credibility score being below the credibility threshold, performing a verification process to confirm the reported issue.

14. A system comprising:
    one or more hardware processors; and
    a storage device storing instructions that, when executed by the one or more hardware processors, cause the one or more hardware processors to perform operations comprising:
       capturing, by the system, trace data of a plurality of users traversing routes by monitoring user devices of the plurality of users;
       causing, by a device interface of the system, presentation of a navigation user interface on a user device of a user;
       receiving, via the navigation user interface, an indication of a selection of an icon presented on the navigation user interface that corresponds to an issue being reported;
       in response to receiving the indication, determining, based on an issue type corresponding to the selected icon, to trigger a severity analysis that determines a severity of the issue, the severity analysis comprising:
          accessing the trace data captured by the system for user devices reporting the issue at a location associated with the issue;
          determining, based on the trace data, a speed or time to travel through the location for each of the user devices; and
          determining the severity of the issue based on the speed or time to travel; and
       updating a database with the issue, the location, and the severity of the issue.

15. The system of claim 14, wherein the location is an inferred location and the operations further comprise identifying the inferred location associated with the issue.

16. The system of claim 15, wherein the identifying the inferred location comprises:
    accessing the trace data received from the user device, the trace data indicating location information and speed of the user; and
    identifying a locale where the user reduced their speed and deviated from navigation instructions, the locale where the user reduced their speed and deviated from the navigation instructions being the inferred location.

17. The system of claim 14, wherein the operations further comprise:
    accessing the trace data for other users near the inferred location; and
    using the trace data for the other users, verifying the issue being reported at the inferred location based on a threshold number or percentage of the other users reporting the issue.

18. The system of claim 14, wherein the causing presentation of the navigation user interface on the user device of the user includes causing presentation of one or more issue icons, each issue icon representing a different issue type to be reported, the icon reporting the issue being selected from the one or more issue icons presented on the navigation user interface.

19. The system of claim 14, wherein the operations further comprise:
    maintaining a credibility score for the user, the credibility score being based on a number of previous issues reported by the user and accuracy of the previous issues reported;
    determining that the credibility score is below a credibility threshold; and in response to the credibility score being below the credibility threshold, performing a verification process to confirm the reported issue.

20. A non-transitory machine storage medium storing instructions that, when executed by one or more hardware processors of a machine, cause the machine to perform operations comprising:

capturing, by the machine, trace data of a plurality of users traversing routes by monitoring user devices of the plurality of users;

causing, by a device interface of the machine, presentation of a navigation user interface on a user device of a user;

receiving, via the navigation user interface, an indication of a selection of an icon presented on the navigation user interface that corresponds to an issue being reported;

in response to receiving the indication, determining, based on an issue type corresponding to the selected icon, to trigger a severity analysis that determines a severity of the issue, the severity analysis comprising:

accessing the trace data captured by the machine for user devices reporting the issue at a location associated with the issue;

determining, based on the trace data, a speed or time to travel through the location for each of the user devices; and determining the severity of the issue based on the speed or time to travel; and updating a database with the issue, the location, and the severity of the issue.

* * * * *